C. B. KIRKHAM AND A. L. THURSTON.
AIRPLANE.
APPLICATION FILED OCT. 7, 1918.

1,434,547.

Patented Nov. 7, 1922.

Inventors
CHARLES B. KIRKHAM
ARTHUR L. THURSTON
By their Attorney

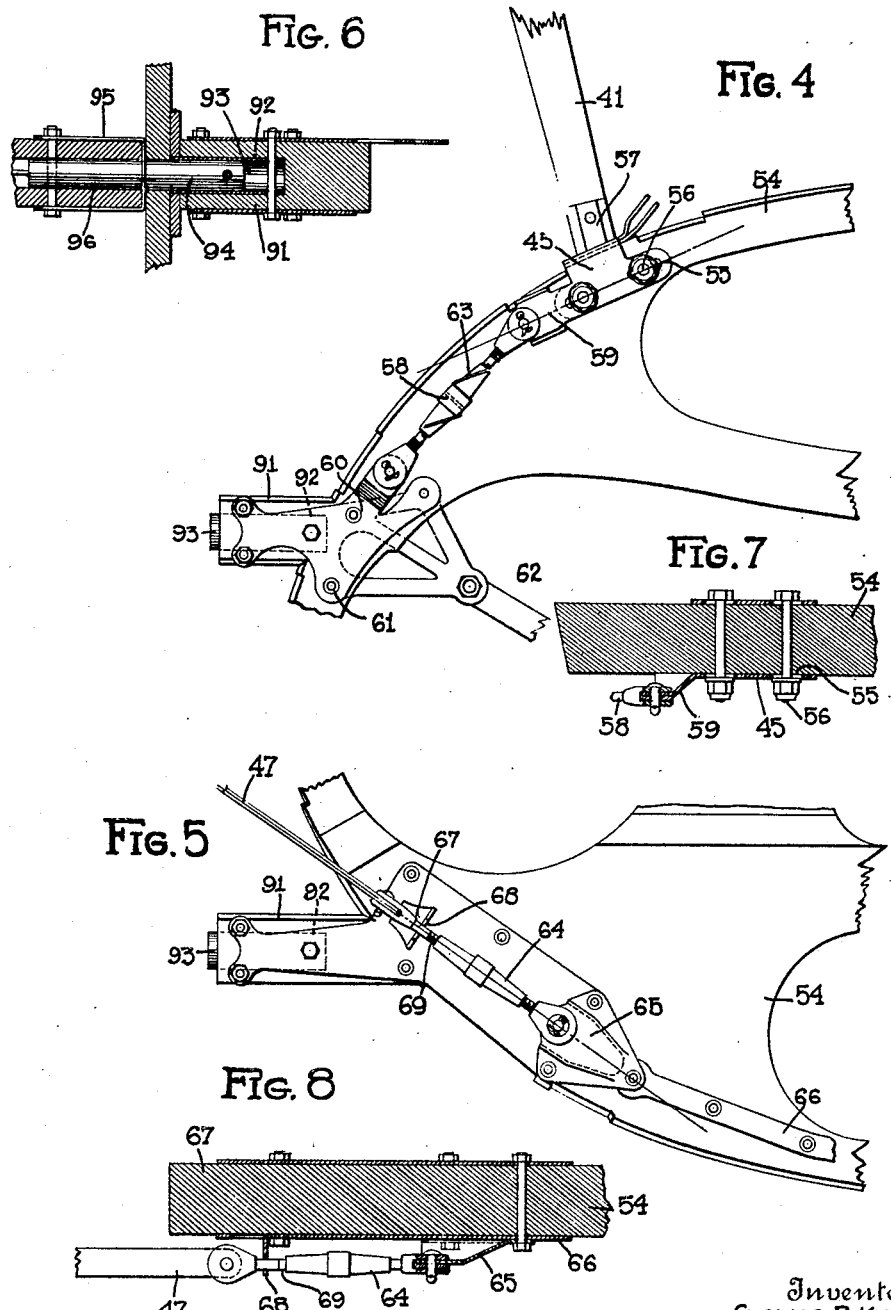

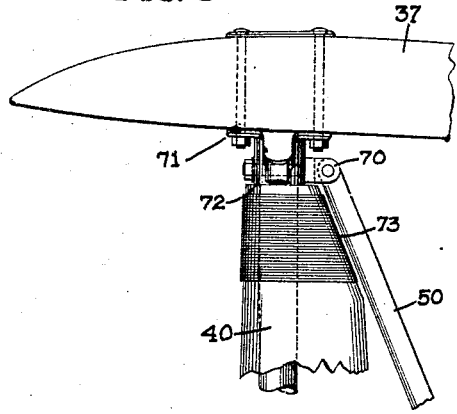
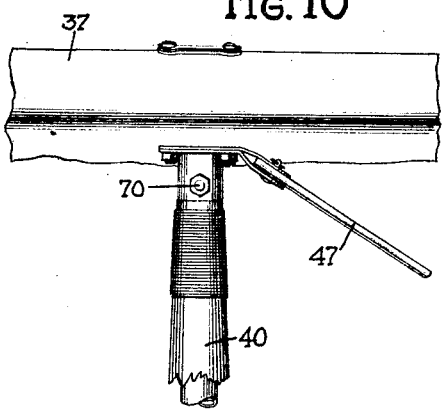
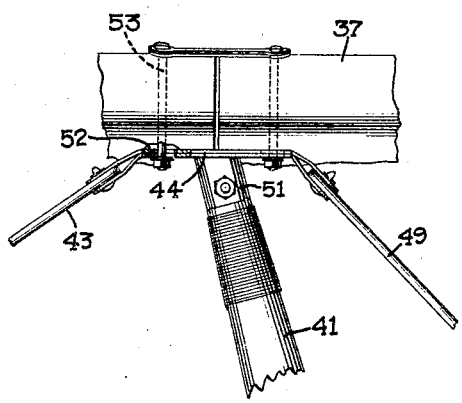
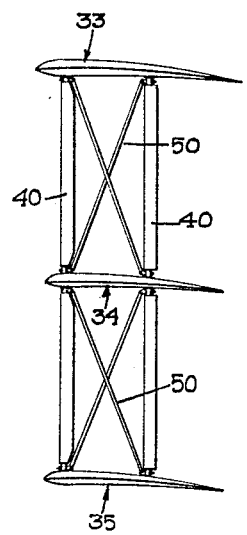

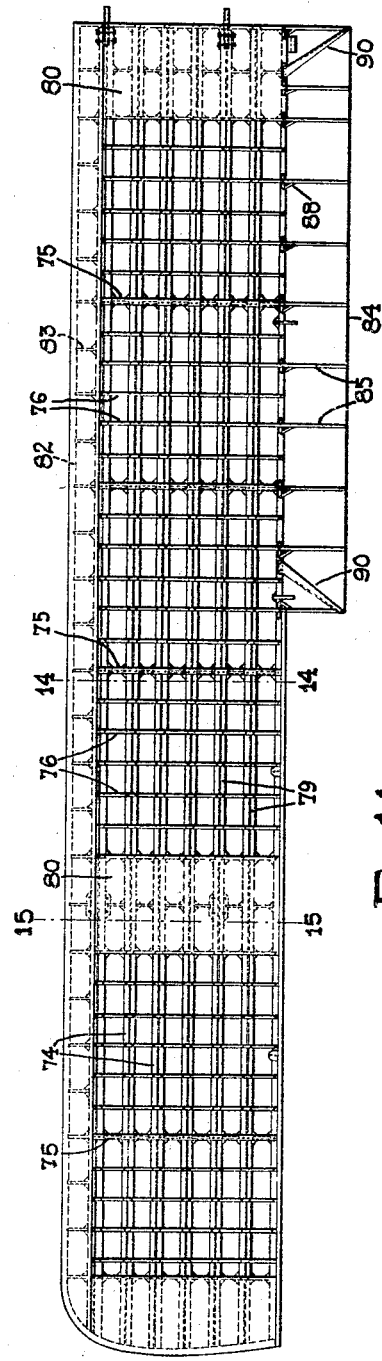

C. B. KIRKHAM AND A. L. THURSTON.
AIRPLANE.
APPLICATION FILED OCT. 7, 1918.

1,434,547.

Patented Nov. 7, 1922.
7 SHEETS—SHEET 7.

Inventors
Charles B. Kirkham
Arthur L. Thurston

By their Attorney

Patented Nov. 7, 1922.

1,434,547

UNITED STATES PATENT OFFICE.

CHARLES B. KIRKHAM, OF GARDEN CITY, AND ARTHUR L. THURSTON, OF HEMPSTEAD, NEW YORK, ASSIGNORS TO CURTISS AEROPLANE AND MOTOR CORPORATION, A CORPORATION OF NEW YORK.

AIRPLANE.

Application filed October 7, 1918. Serial No. 257,274.

*To all whom it may concern:*

Be it known that we, CHARLES B. KIRKHAM and ARTHUR L. THURSTON, citizens of the United States, residing at Garden City and Hempstead, respectively, in the county of Nassau and State of New York, have invented certain new and useful Improvements in Airplanes, of which the following is a specification.

Our invention relates to airplanes and more particularly to high speed military airplanes wherein all flight resistant surfaces, other than absolutely essential, are either stream-lined effectively or completely enclosed in one or more of the major airplane parts. In gaining this end an improved and highly efficient trussing system has been evolved. Instead of using separate turnbuckles (or their equivalent) for each length of wire embodied in the wing truss a single turnbuckle is used for a plural number of wires. The conventional "Pratt" truss is however adhered to although in tightening the wires and organizing the truss certain of the wires are cut accurately to length before attaching rather than approximately to length, and then tightened, as heretofore. This procedure is not only preferred but more or less requisite in view of the fact that wire of streamline section is used. To secure adjustment of the plural number of wires through the use of but one turnbuckle slidable fittings are for the first time, in so far as known, incorporated in the wing truss as a distinct feature thereof. These fittings are located preferably inside the fuselage or body and at the outer extremities of certain of the wing struts or posts. By directly or indirectly connecting one or more of the fittings, preferably the enclosed fittings, with an appropriate adjusting means the wires can be tightened or adjusted and the fittings remote from the adjusting means slightly shifted to proportionately adjust the wires indirectly connected with the adjusting means.

Another characteristic of the invention incident to the use of streamlined wire and adjustable fittings is the method of assembling the wing structure. This method preferably consists in giving the wings a definite dihedral angle by attaching thereto fixed drop wires of definite or predetermined length, next giving the wings a definite angle of incidence by attaching thereto adjustable drop wires, (but slight adjustment being relied upon to obtain an accurate setting of the wings), and finally trussing the wing structure in its entirety by attaching thereto and adjusting lift wires, the tightening of the lift wires being instrumental in maintaining the dihedral angle and angle of incidence previously given the wings. The specific relation of the wires and the relative arrangement of the various fittings and the character of wire used also constitute features of novelty hereinafter more fully disclosed.

Still another characteristic of the invention is the construction of the wing or wings per se in a manner providing for a working factor of safety even though a plural number of the wing beams are shattered as a result of gun fire or other cause. In this connection a multiplicity of longitudinal beams are provided with a corresponding reduction in the number of transverse ribs. Instead of using a large number of transverse ribs only a few ribs are required. Between adjacent ribs a multiplicity of cap strips are provided which, together with the increased number of beams, offer a rigid frame-work or foundation for the fabric covering of the wing. Such a construction not only strengthens the framework of the wing but it simultaneously offers a means whereby the cross sectional contour of the wing is held constant throughout substantially its full length with the result that sagging and whipping of the covering, heretofore noticeable, is completely eliminated. There are also a number of constructional details incorporated in the wing structure which lend it novelty and at the same time improve its construction both from a standpoint of reliability and production. These latter characteristics will be hereinafter explained.

Of the drawings:

Fig. 4 is a detail elevation of one of the torque wire fittings and its associated adjusting means;

Fig. 5 is a detail elevation of one of the lift wire fittings and its associated adjusting means;

Fig. 6 is a fragmentary view illustrating the preferred type of wing hinge used for attaching the intermediate and lower wings to the fuselage;

Fig. 7 is a section on the line 7—7 of Fig. 4;

Fig. 8 is a section on the line 8—8 of Fig. 5;

Fig. 9 is a detail end elevation of one of the wing post socket fittings;

Fig. 10 is a front elevation of the fitting illustrated in Fig. 9;

Fig. 11 is a view similar to Fig. 10, illustrating partly in section, one of the slidable or adjustable wing strut fittings;

Fig. 12 is an end elevation of the wing structure showing the arrangement of the stagger wires;

Fig. 13 is a plan view of a wing with the fabric covering removed;

Fig. 14 is an enlarged transverse section on the line 14—14 of Fig. 13;

Fig. 15 is a similar view on the line 15—15 of Fig. 13;

Figure 1:
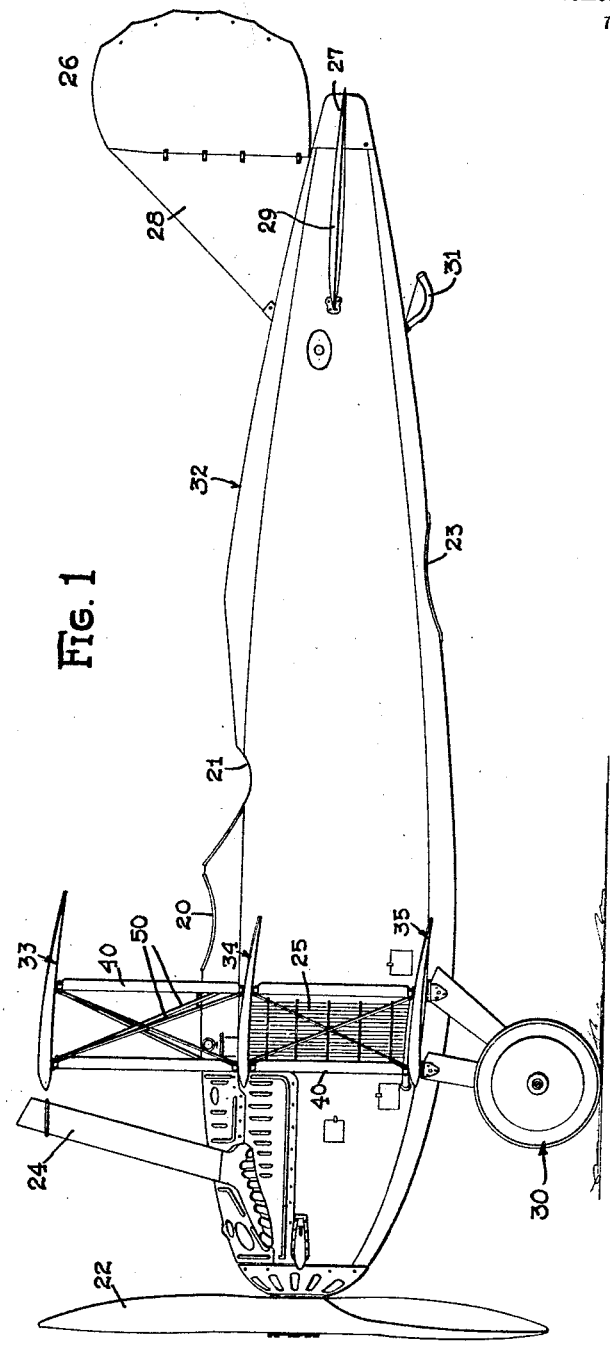
Fig. 1 is a side elevation of the improved machine.

In the embodiment of the invention selected for illustration only such parts of the machine as relate to the wing structure have been detailed. In Fig. 1 however the complete machine is shown in side elevation. The fuselage or body is of the monocoque veneer covered type and is provided with a forward cockpit 20 and a rear cockpit 21, the latter being the gunner's cockpit, as the machine, fully loaded, is equipped with four or more machine guns, two of which are synchronized with the propeller 22 and are controlled from the forward cockpit and two arranged to be fired from the rear cockpit 21. All guns are of the machine-gun type and so arranged relatively to the machine as to be fired in all directions. Although the machine guns are not shown in the drawings it should be noted that the underneath portion of the tail end of the fuselage is provided with a combined sight and gun fire opening 23 through which one of the machine guns can be fired if the machine is attached from the rear and beneath. Inside the fuselage and at the extreme forward end thereof the power plant for driving the propeller 22 is located. The power plant preferably comprises a multi-cylinder internal combustion engine having its exhaust ports in manifold as indicated at 24. The radiator of the power plant comprises radiator sections 25 arranged at opposite side of the fuselage, preferably intermediate the lower and intermediate supporting surfaces (if a triplane) and close up against the fuselage sides. This location is preferred not only in view of the decreased resistance which the radiator sections offer themselves but because of the further fact that it is possible to better streamline the fuselage or body as a whole. The empennage, at the rear end of the body, comprises the usual vertical rudder 26, elevator flaps 27, vertical stabilizing fin 28 and horizontal stabilizing fins 29. The formation of these surfaces is also such that they collectively offer a minimum of resistance commensurate with their size. The landing gear includes in addition to the landing gear per se designated as 30, a tail skid 31. These parts of the airplane are also constructed with a view to minimum resistance. The constructional features of the fuselage and landing gear have been set forth in separate applications concurrently filed. It is to be understood however that the wing structure hereinafter described is adaptable to both land and water machines other than the type of machine herein disclosed. If used in connection with a water machine a float type landing gear would supplant the landing gear 30 herein shown. The fuselage is designated as an entirety by the numeral 32.

From the standpoint of operativeness it is immaterial whether the machine is of the monoplane, biplane, triplane or multiplane type, although a triplane wing structure is shown. It comprises three superposed supporting surfaces 33, 34 and 35 preferably of equal span, and chord a similar profile. The upper supporting surface 33 comprises a center or engine section panel 36 and outer or main panels 37, the latter continuing the engine section panel respectively right and left from the longitudinal vertical plane of the fore and aft axis of the craft. The intermediate supporting surface 34 and the lower supporting surface 35 are alike. Each of these supporting surfaces comprises opposed detachable panels 38 and stub-wings or fixed panels 39. The stub-wing panels 39 are built into the fuselage 32 as a composite part thereof and merely serve as foundations for the outer panels 38 of the intermediate and lower wings.

Figure 2:
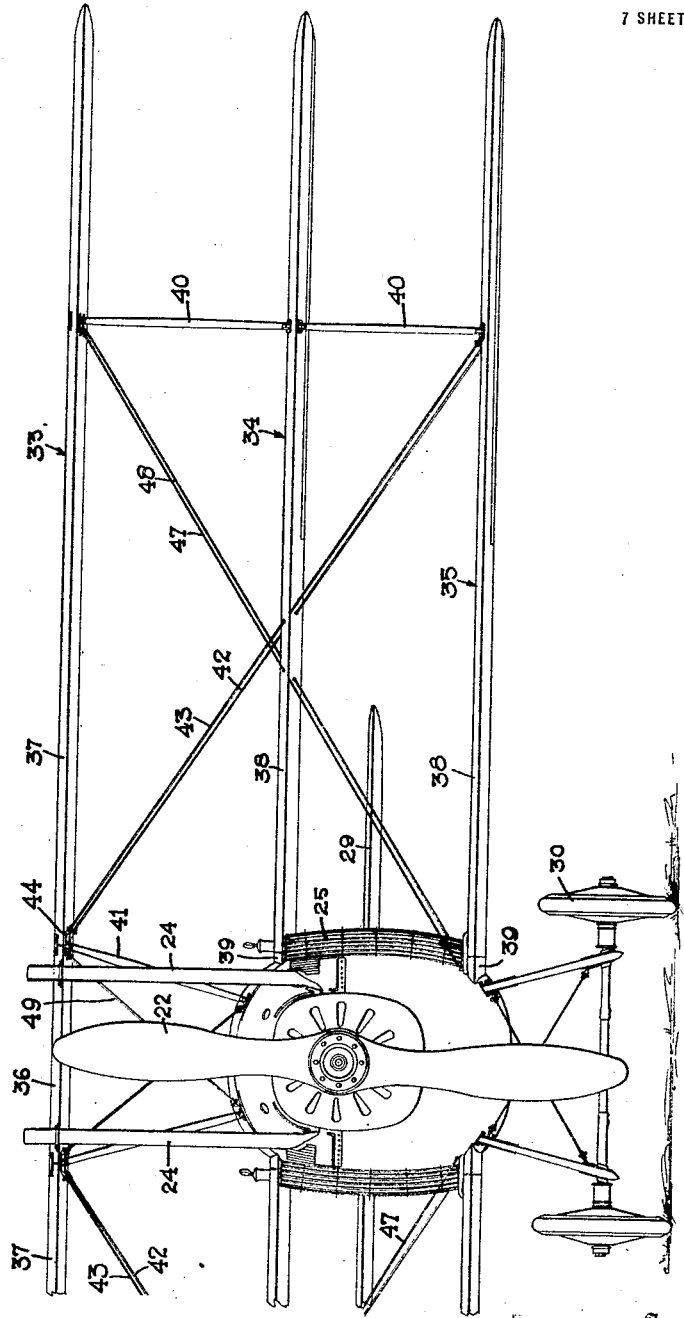
Fig. 2 is a front end elevation (partly broken away)
Figure 3:
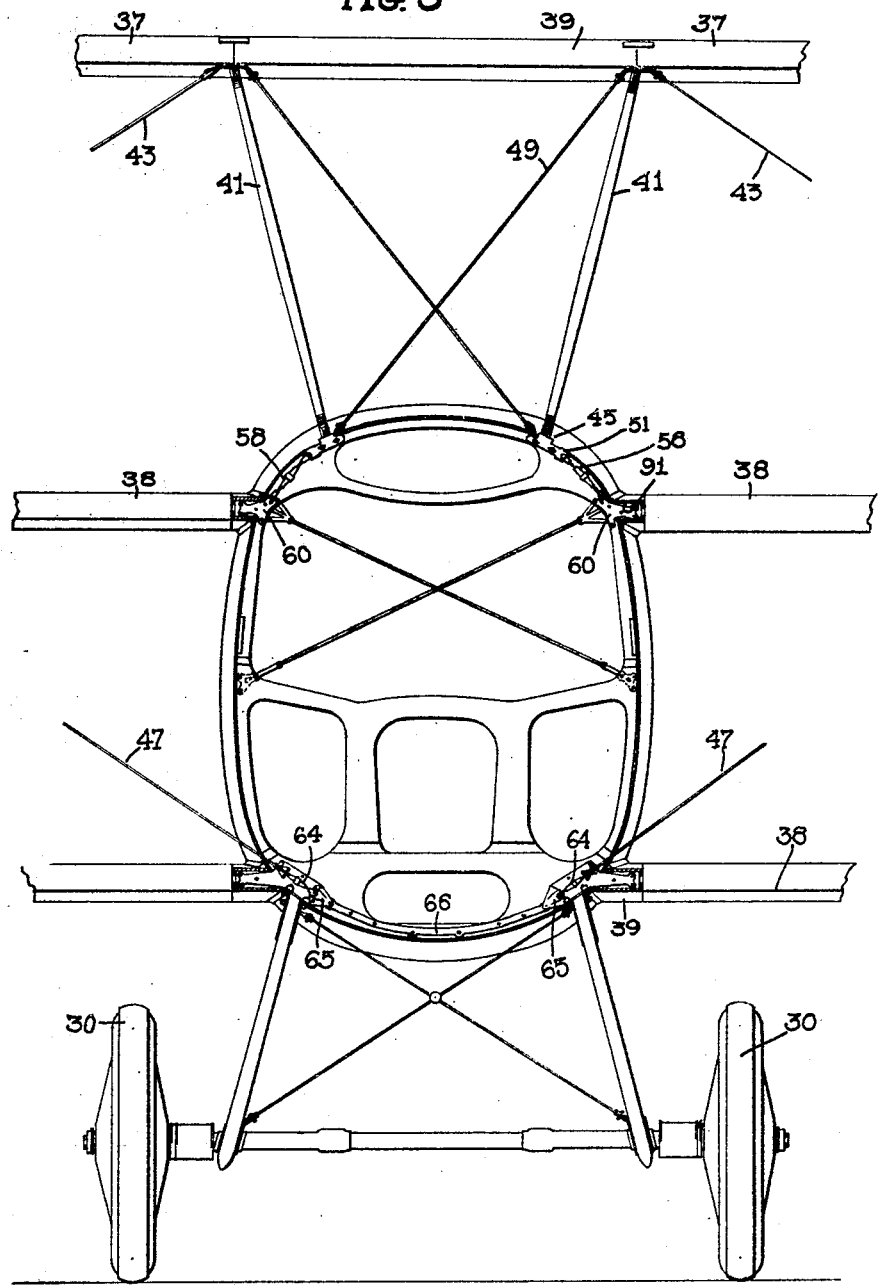
Fig. 3 is an enlarged transverse section of the fuselage at the wing section showing the relative arrangement of the slidable fittings and the manner in which the brace wires of the wing structure are fastened inside the fuselage.
Figure 16:
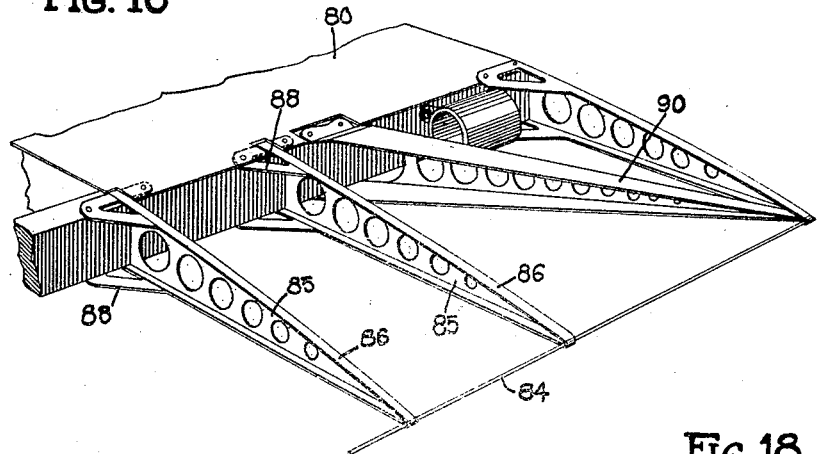
Fig. 16 is a detail perspective view showing the character of metal ribs employed in the erection of the wing.

The wing truss preferably comprises biplane wiring, let through the intermediate supporting surface 34, and wing-posts or wing-struts 40 and 41. The wing-struts 40 interconnect respectively the upper and intermediate and intermediate and lower wings while the wing-struts 41 interconnect the fuselage and the upper supporting surface 33. The wing struts 41 diverge upwardly from the fuselage (see Fig. 2) to increase the forward range of vision of the pilot and at the same time offer points of support for the upper supporting surface distantly spaced laterally out from the longitudinal vertical plane of the fore and aft axis of the machine. Such an arrangement is better and stronger than the more or less conventional arrangement wherein either parallel or upwardly convergent center struts are used.

In trussing the wing structure the "Pratt" type truss is retained although the manner and method of assembling the truss is quite different from the practise now in vogue. This new method or practise of assembling the wing truss is not only preferred but more or less essential for the reason that in the present machine wire of streamline section is used throughout and the use of turnbuckles (or their equivalent) for tightening each wire separately avoided in view of the unnecessary resistance which they offer during flight. In fact the relative arrangement of the wires of the wing truss is such that but a very minimum of turnbuckles is required and these, as explained hereinafter, are completely enclosed in the fuselage or body of the craft.

In assembling the wing structure the lower supporting surface 35 or rather the panels 38 thereof are fastened to the lower stub wings 39. The rear drop or landing wires 42 are then inserted. These wires are cut accurately to length and are fastened to the lower supporting surface 35 at the foot of the rear outer wing strut 40. No adjustment of these wires takes place. By cutting them accurately to the required length the desired dihedral angle, whether negative, positive or zero, of the wing structure is obtained, as the length of these wires determines the angular relation of the wings. After inserting the rear drop wires 42 the forward drop wires 43 are inserted. These wires, unlike the wires 42, are adjustable, not in the usual manner, but through slidable fittings 44 and 45 mounted respectively at the outer extremities of the center struts 41 and inside the fuselage of the machine. By tightening these wires, as hereinafter explained, the wings are given the angle of incidence required. The wires 43 are also cut approximately to length, the adjustment being provided in the interest of accuracy as it is next to impossible to obtain an accurate setting of the wings, that is, incidence setting, without slight adjustment. This arrangement is entirely practical as a slight inaccuracy or variation in the dihedral setting of the wings would have no marked effect upon the flying characteristics of the machine, while a similar variation in the angle of incidence of the wings might distinguish between failure and success. After setting the wings as described the front and rear lift wires 47 and 48 are inserted, tightened, and the wing structure in its entirety rigidly trussed. The manner in which these wires are adjusted will be likewise hereinafter explained. Suffice it to say that the wing-struts 40 are inserted after the insertion of the drop wires 43. These struts are cut accurately to length so that the setting of the one (lower) supporting surface simultaneously sets them all.

In addition to the drop and lift wires of the wing, crossed torque wires 49 and stagger wires 50 are provided. The torque wires 49 act in conjunction with the front dropwires 43 in that a tightening of the former is instrumental in giving the wings the incidence setting required. The torque wires 49 are cross arranged between the forward center struts 41 and connected with the slidable fittings 44 and 45. The slidable fittings 44 (detailed in Fig. 11) are of the flat pattern type having an integral socket 51 within which the ends of the center struts 41 are seated. Each fitting is provided with elongated openings 52 through which the attaching bolts 53 for the fittings extend. The ends of these slots or openings limit the sliding movement of the fittings. The fittings 45 mounted at the foot of the struts 41 are of a somewhat similar construction. These fittings are enclosed in the fuselage and directly attached to one of the fuselage diaphragms 54. They too are provided with slots 55 through which attaching bolts 56 extend and sockets 57 within which the opposite strut ends are seated. The bolts 56 penetrate the diaphragm and offer a means for limiting the sliding movement of the fittings.

The adjusting means for the fittings 45 comprises turnbuckles 58 directly attached to off-set ears 59 formed upon the fittings. The turnbuckles 58 are also directly attached to fittings 60 fastened as at 61 to the diaphragm 54 at points removed from the fittings 45. Accordingly, by adjusting the turnbuckles the fittings 45 are moved. The fittings 60 are fixed relatively to the diaphragm and so positioned relatively to the fuselage that they combinedly serve as anchorages for fuselage torque wires 62 provided at the engine section thereof. Moreover, the fittings 45 and 60 and the adjusting means 58 are enclosed, for the major part, within the confines of the fuselage. The adjusting devices as indicated in Fig. 4, if desired, may be provided each with a wirelock 63.

From the above construction and arrangement it will be noted that the slidable fittings 44 provide connections between the torque wires 49 and the front wires 43 whereby a tightening of the torque wires simultaneously tightens the wires 43 in giving the wings the incidence setting required. Both turnbuckles 58 may be reached from the inside of the fuselage, the turnbuckle on the left hand side of the fore and aft axis of the craft being instrumental in tightening the drop wire on the right hand side and vice versa. This latter feature is a direct result of the fact that the torque wires 49 are cross arranged. No torque wires are provided in the vertical plane of the rear center struts 41 nor are the rear drop wires adjustable. The fittings corresponding to the fittings 44 at the outer ends of the rear center struts are fixed as no adjustment at this point is required. Only the fittings mounted at the extremities of the forward center struts 41 are slidable. All other fittings are fixed.

To secure adjustment of the lift wires 47 and 48 in tightening the truss turnbuckles (or their equivalent) 64 are provided. These turnbuckles are enclosed within the fuselage and directly connected with fittings 65 fastened to the diaphragm 54 in proximity to the lower stub wing extensions 39. The fittings 65 (detailed in Fig. 8) are interconnected by a tie-strap 66 fastened to the diaphragm 54 whereby the lift load upon the opposite wings is more or less equalized. The turnbuckles 64 for the separate lift wires are however independently adjustable. This arrangement is duplicated for both sets of lift wires, i. e., front and rear—also the fittings 55 and tie-connections 66.

In addition to the fittings 65 to which the lift wires 47 and 48 are directly connected, notched fittings 67 are provided. Within the notches 68 of these fittings the outer shanks 69 of the turnbuckles 64 are seated. Throughout a portion of their length the shanks 69 are given a polygonal cross section whereby the wires 47 and 48 are held against twisting after adjustment. This is desirable in that the streamline wires are held with their blunt edges foremost so as to be properly presented to the air.

The stagger wires, like the wing struts 40 are accurately cut to length to eliminate the use of adjusting devices. They are directly attached at their ends to pins 70 carried by fittings 71 mounted at the strut ends. These fittings are of the flat pattern type and socketed as at 72 to receive the strut ends. The pins 70 also serve as securing means for the struts (see Fig. 9). For compactness, the ends of the struts 40 are chamfered as at 73 that the wires 50 may be fastened in the manner stated. Combined metal and wood struts, the wood constituting fairing, are preferred.

The wings or outer panels of the superposed supporting surfaces are preferably constructed alike. Each wing or panel comprises a multiplicity of longitudinal beams 74, spaced but slightly apart; a plural number of transverse ribs 75, spaced widely apart; and a multiplicity of transverse cap strips 76, spaced slightly apart. The beams 74 extend parallel throughout the full length of the wing and are constructed preferably of contiguous beam-sections 77 and 78 having a lamina of veneer (preferably) between them. The beam-sections 77 and 78 have their adjacent faces channelled for lightness while the lamina or intermediate reenforcing strip 79 is of constant cross section throughout. Beams of this construction are light and strong and at the same time capable of withstanding the various stresses set up in the wing structure during the operation of the machine. The ribs 75 are interrupted at each beam 74.

The spacing of the transverse ribs 75 is of such character that only a minimum number of such ribs is required. The increased number of beams 74 make the use of a large number of transverse ribs unnecessary. The ribs 75 hold the beams in parallelism and with specially designed box-beams 80 take up the drift and anti-drift compression stresses. The box-beams 80 comprise top and bottom strips of veneer arranged to extend from the foremost to the rearmost beam. They are located at the strut points in the wing and are of sufficient width longitudinally of the wing to distribute the compression stress throughout a substantial portion of its area. The width of the box-beams is preferably equal to the distance between adjacent transverse ribs 75 whereby certain of the ribs (those adjacent the strut points in the wing) enter into and in reality constitute parts of the box-beams themselves. The ribs 75 are toe-nailed in place as indicated at 81 for added strength and terminate at their rear ends flush with the rear longitudinal beam.

The cap strips 76, of which there are a large number, are so relatively arranged that they alone, except at the leading edge of the wing, constitute a bearing surface for the fabric covering of the wing. Being thus closely spaced they prevent sagging of the wing covering with the resulting advantage that the cross sectional area of the wing is held constant throughout its full length, and whipping, due to the propeller blast acting on the wing surface, avoided.

The leading edge portion of the wing comprises a leading edge strip 82 and nose webs 83, the latter being provided in addition to the transverse ribs 75 although separately formed and located at intervals intermediately of adjacent transverse ribs. From the leading edge strip back to the forward wing beam 74 the top and bottom of the wing frame-work is covered with veneer.

Figure 18:
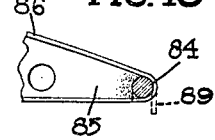
Fig. 18 is an enlarged fragmentary view illustrating the tab formation and connection between the metal ribs and trailing edge strip of the wing.
Figure 17:
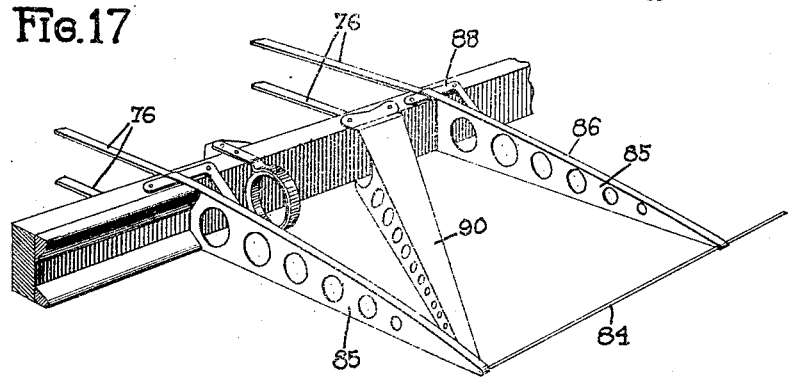
Fig. 17 is a similar view with the ribs viewed from a different angle.

The trailing edge portion of the wing comprises a trailing edge strip 84 and transverse ribs 85. The ribs 85 are of flat pattern construction in that each rib comprises a flat metal strip having its longitudinal edges bent at right angles as indicated at 86. These flanges jointly provide capstrips for the ribs 85 and at the same time strengthen the ribs throughout their longitudinal extent. The forward extremities of the flanges 86 overlap the rear wing beam 74, top and bottom, to provide a fastening means for the rib. If desired, the overlapping portions of the ribs 85 may be enlarged as at 88 to provide additional bearing surfaces. At the rear end of the top flange of each rib 85 a tab 89 is formed. This tab is adapted to be bent around the trailing edge strip 84 to provide a fastening means for the rib at its rear extremity. Its construction is best illustrated in Fig. 18 of the drawings. The tab, when bent around the trailing edge strip, is welded to it. Preferably the ribs 85 continue the transverse ribs 75 of the wing and alternately the cap strip 76.

The ends of the trailing portion of the wing are reenforced or braced as indicated at 90 by diagonal ribs similarly formed. These ribs and also the ribs 85 are provided with lightening holes that the weight of the wing may be reduced. The big advantage in using a flat pattern metal construction in the rib formation is that each of the separate ribs is constructed as a unit and may be produced in quantity and at a minimum cost. Moreover the ribs being constructed of metal lend strength to the wing at its trailing edge and accordingly provide for the elimination of a number of additional parts.

The fastening for the intermediate and lower supporting surfaces of the wing structure is accomplished by especially formed wing hinges or sockets of a construction best illustrated in Fig. 6. Two of such hinges are provided for each wing. To receive the wing hinges certain of the diaphragms of the fuselage are provided with extensions or lugs 91 which project beyond the outer fuselage covering. These lugs are in turn provided with recesses 92, metal lined as at 93, within which the inner portion of a stem 94 of the wing hinge is seated. The male portion of the wing hinge comprises in addition to the inner portion of the stem 94 an outer portion and a substantially U-shaped fitting 95 having its extensions arranged to lie flat against opposite faces of the particular wing beam with which the wing hinge is associated. The bight portion or connecting portion of the U-shaped member 95 bears flat against the outer face of the end rib of the wing 38 to offer a substantial bearing surface and at the same time take up a certain amount of compression stress. The outer portion of the stem 94 is let through the end rib as intimated. It is also seated in a recess 96 formed in the wing beam in much the same manner as the recess 92 of the diaphragm. In both instances the stem 94 is pinned.

A wing structure and truss of the above construction offers a minimum of resistance to the forward travel of the machine. All adjusting means, such as turnbuckles are enclosed in the body of the machine. The struts too are effectively streamlined throughout while the construction of the wing is such that mutilation of one or more of the wing-beams will not destroy the working factor of safety accorded the wing. Such a wing construction also eliminates the use of internal wiring as the transverse box-beams 80 together with the ribs 75 and the plural number of beams take up the drift and anti-drift compression stress. The use of slidable fittings however is of the utmost importance as accurate incidence setting of the wings may be accomplished by a minimum of adjustment. Only the two turnbuckles 58 need be adjusted to effect this end. Furthermore, by adjusting these turnbuckles both the torque and front drop wires are simultaneously tightened as the slidable fittings mounted at the strut ends offer a connection between these separate wires. Care should be exercised however in cutting the fixed wires as it is necessary that their length be predetermined to accord the wing structure the dihedral angle desired.

While we have described our invention in detail in its present preferred embodiment, it will be obvious to those skilled in the art after understanding our invention that various changes and modifications may be made therein without departing from the spirit or scope thereof. We aim in the appended claims to cover all such modifications and changes.

What is claimed is:

1. In an airplane, superposed wings, nonadjustable brace wires interconnecting the wings, the dihedral setting of the wings being directly proportional to the length of said wires, and adjustable brace wires likewise interconnecting the wings, the incidence setting of the wings being variable by adjustment of said last mentioned wires.

2. In an airplane, superposed wings, nonadjustable brace wires fastened at opposite ends to different wings and extended downwardly and outwardly at an angle, and an adjustable brace wire similarly fastened and similarly arranged, the length of the nonadjustable brace wire being instrumental in fixedly setting the wings at the desired dihedral angle and the length of the adjustable brace wires being instrumental in fixedly setting by adjustment the angle of incidence of the wings.

3. An airplane wing truss including superposed wings, non-adjustable drop wires of determined length interbracing the superposed wings, the length of the drop wires being predetermined for the purpose of setting the wings at the desired dihedral angle; additional drop wires likewise interbracing the superposed wings, means for varying the effective length of the last mentioned drop wires, the variation in effective length of the last mentioned drop wires being instrumental in setting the wings at the desired angle of incidence, lift wires interbracing the superposed wings, and means for varying the effective length of the lift wires to rigidly truss the wing structure as a whole.

4. An airplane wing truss including superposed wings, non-adjustable rear drop wires of determined length interbracing the superposed wings, the length of the rear drop wires being predetermined for the purpose of setting the wings at the desired dihedral angle; front drop wires likewise interbracing superposed wings; means for varying the effective length of the front drop wires, the variation in effective length of the front drop wires being instrumental in setting the wings at the desired angle of incidence; lift wires interbracing the superposed wings; and means for varying the effective length of the lift wires to rigidly truss the wing structure as a whole.

5. An airplane wing truss in which superposed wings are given a definite dihedral setting by attaching thereto non-adjustable drop wires of predetermined length; in which the superposed wings are given a definite incidence setting by attaching thereto additional drop wires, the effective length of the last mentioned drop wires being variable; and in which both wings are rigidly trussed together by attaching thereto lift wires, the length of the lift wires being likewise variable whereby, when tightened, the wings are held as previously set by the fixed and adjustable drop wires collectively.

6. An airplane including a supporting surface, a fitting fastened to the airplane structure and movable relatively thereto, and a brace wire for the supporting surface connecting with the fitting and adapted to be tightened by its movement.

7. An airplane including a supporting surface, a fuselage, a fitting fastened to the fuselage structure inside the outer covering thereof for movement relatively thereto, and a brace wire for the supporting surface connecting with the fitting and adapted to be tightened by its movement.

8. An airplane including a supporting surface, wing struts, a slidable fitting mounted at the end of one of the wing struts, and a brace wire for the supporting surface connecting with the fitting and adapted to be tightened by the sliding movement thereof.

9. An airplane including a supporting surface, separate brace wires for the supporting surface, a connection between the separate wires including a fitting carried by the airplane structure for sliding movement relatively thereto, and means for exerting a pull upon one of the wires for tightening both of them through the sliding movement of said fitting.

10. An airplane including a supporting surface, separate brace wires for the supporting surface, a slidable fitting connecting the separate wires, and means for exerting a pull upon one of the wires at a point remote from the fitting for tightening both wires simultaneously.

11. An airplane including a supporting surface, a slidable fitting, a brace wire for the supporting surface connecting with the fitting and adapted to be tightened by the sliding movement thereof, and means inside the fuselage for sliding the fitting.

12. An airplane including a supporting surface, separate brace wires for the supporting surface, a slidable fitting connecting the separate wires, a second slidable fitting, and adjustable means connecting with the last mentioned fitting for tightening both wires.

13. An airplane including a supporting surface, a fuselage, brace wires for the supporting surface, carried at one end inside the fuselage, and adjusting means for the wires connecting with them at their inner ends.

14. An airplane including a supporting surface, a fuselage, brace wires for the supporting surface carried at one end inside the fuselage, a connection inside the fuselage between the brace wires, and wire adjusting means also enclosed in the fuselage.

15. An airplane wing truss including in combination, non-adjustable drop wires of determined length and streamlined section, the length of the drop wires being predetermined for the purpose of setting the wings at the desired dihedral angle, additional drop wires; means for varying the effective length of the last mentioned drop wires, the variation in effective length of the last mentioned drop wires being instrumental in setting the wings at the desired angle of incidence, lift wires; and means for varying the effective length of the lift wires to rigidly truss the wing structure as a whole.

16. The method of assembling and trussing the wing structure of an airplane which consists in first giving the wings a definite dihedral angle by attaching thereto fixed drop wires of determined length; next giving the wings a definite angle of incidence by attaching thereto and adjusting drop wires other than the drop wires first mentioned; and finally rigidly trussing the wing structure in its entirety by attaching thereto adjusting lift wires, the adjustment of the lift wires being instrumental in maintaining the dihedral angle and angle of incidence previously given the wings.

In testimony whereof we hereunto affix our signatures.

CHARLES B. KIRKHAM.
ARTHUR L. THURSTON.